United States Patent [19]

Reenstra

[11] 4,011,478
[45] Mar. 8, 1977

[54] MAGNETIC SPEED SENSING MECHANISM

[75] Inventor: Arthur L. Reenstra, Hopkinton, N.H.

[73] Assignee: Texas Instruments Incorporated, Dallas, Tex.

[22] Filed: June 2, 1975

[21] Appl. No.: 583,009

[52] U.S. Cl. .................................. 310/155; 310/166
[51] Int. Cl.² ........................................ H02K 21/38
[58] Field of Search ........................... 329/170–179; 310/155, 168, 111

[56] References Cited

UNITED STATES PATENTS

| 3,158,033 | 11/1964 | Cohen | 310/168 X |
| 3,252,024 | 5/1966 | Loudon | 310/155 |
| 3,424,578 | 1/1969 | Strnat et al. | 148/DIG. 3 |
| 3,793,545 | 2/1974 | Leiber et al. | 310/168 |
| 3,876,927 | 4/1975 | Gee et al. | 310/155 X |

Primary Examiner—Donovan F. Duggan
Attorney, Agent, or Firm—Harold Levine; John A. Haug; James P. McAndrews

[57] ABSTRACT

A speed sensing mechanism for a motor vehicle skid control system has ferromagnetic portions spaced around the periphery of an exciter wheel, the exciter wheel being adapted to be mounted for movement with a motor vehicle wheel whose speed is to be monitored to move the ferromagnetic portions of the exciter wheel in a plane through a station at a rate or frequency corresponding to the speed of vehicle wheel rotation. A permanent magnet is disposed within a wire sensor coil and is mounted at the station with a first pole face in closely spaced relation to the plane of movement of the ferromagnetic portions of the exciter wheel so that the reluctance of the magnetic circuit established by the permanent magnet is varied as each of the ferromagnetic elements is moved through the station, thereby to induce an electrical signal in the coil having a frequency corresponding to vehicle wheel speed.

15 Claims, 4 Drawing Figures

MAGNETIC SPEED SENSING MECHANISM

Magnetic speed sensing systems have been employed in motor vehicle skid control systems for determining the relative speeds of rotation of the vehicle wheels and for providing an electrical signal utilized in the skid control system for regulating braking of the vehicle wheels in response to such speed determinations. In these known mechanisms, an exciter wheel having ferromagnetic portions spaced therearound is rotated with a vehicle wheel for moving the ferromagnetic portions in a plane through a sensing station at a rate or frequency corresponding to the speed of vehicle wheel rotation. A permanent magnet of a soft iron alloy or the like having a wire sensing coil wrapped around the magnet is disposed at the sensing station with a pole face of the magnet in closely spaced relation to the plane of movement of the ferromagnetic portions of the exciter wheel. In this arrangement, movement of the exciter wheel with the vehicle wheel varies the reluctance of the magnetic circuit established by the soft iron magnet to induce an electrical signal in the sensing coil having a frequency corresponding to the vehicle wheel speed. These known sensing mechanisms have been used with some success. However, it has now been recognized that such known mechanisms provide output signals having a very poor signal to noise ratio and that, in certain cases, the known mechanisms can provide erroneous output signals dangerously affecting operation of a skid control system. For example, it has been found that the known speed sensing systems can provide an erroneous signal which would prevent braking of a heavy motor vehicle attempting to maintain braking on a steep hill, thereby endangering the vehicle operator and the operators of following vehicles.

It is an object of this invention to provide a novel and improved magnetic speed sensing mechanism; to provide such a mechanism which is particularly adapted for use in regulating operation of a motor vehicle skid control system; to provide such a mechanism which can be used to regulate such a skid control system without risk to the vehicle operator; and to provide such a mechanism which is of simple, rugged and economical construction.

Briefly described, the novel and improved variable reluctance magnetic speed sensing mechanism of this invention includes a movable member or exciter wheel having a plurality of ferromagnetic means disposed in spaced relation to each other on the movable member, the member being adapted to be mounted for movement with a device whose speed is to be monitored for moving the ferromagnetic means in a plane through a sensing station at a frequency corresponding to the speed of movement of the device. Preferably the exciter wheel comprises a disc of ferromagnetic material adapted to be mounted for rotation with a motor vehicle wheel, the disc having a plurality of apertures or indentations spaced around the disc periphery so that ferromagnetic means or elements such as portions of the disc located between the disc apertures or indentations are moved in a plane through the sensing station at a frequency corresponding to the speed of rotation of the vehicle wheel. Preferably the disc has a large number of apertures or indentations around its periphery so that a large number of very narrow ferromagnetic means are provided on the disc to achieve maximum information output from the exciter wheel during each wheel revolution.

In accordance with this invention, a novel magnetic sensor is fixedly or adjustably mounted at the sensing station, the sensor including a wire sensor coil of a tubular configuration having a selected length and including a permanent magnet formed of a rare earth-cobalt material having a very steep magnetization characteristic. The permanent magnet is of a rod configuration of significantly shorter length than the sensor coil and is disposed within the coil at a first coil end, preferably with a limited portion of the magnet extending from the coil, so that a first pole face of the magnet is positioned in closely spaced relation to the plane of movement of the ferromagnetic means which are carried through the sensing station by the exciter wheel. Preferably the magnet is proportioned so that the first pole face has a width corresponding to the width of the individual ferromagnetic elements carried by the exciter wheel. A core of ferromagnetic material such as a soft iron alloy is also disposed within the sensor coil extending through the remainder of the length of the coil, and a ferromagnetic shell is disposed around the sensor coil and is magnetically connected to the core at the opposite end of the sensor coil. In a preferred embodiment, an additional shorted wire coil is disposed around a portion of the core or permanent magnet.

In this improved mechanism, the flux density obtainable with the rare earth-cobalt magnet permits an adequate sensor signal level to be achieved even though a small magnet volume is used to achieve low cost and even though the first magnet pole face is small enough to match the width of narrow ferromagnetic portions which are spaced closely together on the exciter wheel to permit maximum information output during each exciter wheel revolution. The sensor coil length being greater than the length of the permanent magnet permits the desired number of winding turns to be accommodated in the coil to achieve a desired sensor signal output level even though a relatively small permanent magnet is used and also permits a ferromagnetic shell and core to be accommodated around and within the coil without excessively increasing the bulk of the sensing mechanism. Further, the disposition of the small rare earth-cobalt magnet at one end of the coil substantially eliminates noise increments of the sensor coil output signal such as might be due to leakage flux from the permanent magnet material.

Most important, it is recognized that the magnet pole face has to be spaced from the plane of movement of the exciter wheel ferromagnetic means to allow wheel rotation free of interference with the magnet. On the other hand, such a spacing constitutes an air gap in the magnetic circuit in the sensor and should be minimized to maintain a desired level of signal output by the sensor coil. In this regard, at least a certain minimum spacing of the pole face is preferably used to allow tolerance in manufacture and mounting of the exciter wheel and sensor without requiring use of complex wheel traveler means or the like to keep the pole face spacing constant. However, any variation in this air gap occurring during exciter wheel rotation due to such a tolerance or due to exciter wheel vibrations could tend to be reflected as variations in the reluctance of the magnetic circuit established by the magnet and could provide noise increments in the output signal provided by the sensor coil. In extreme cases, where the sensing mechanism is used in a skid control system, vibration of the exciter wheel which might occur as a heavy vehicle attempting braking on a steep hill could result in a high frequency variation in the noted air gap and could tend to result in an erroneous signal output by the sensor coil which could prevent braking of the vehicle. However, the rare earth-cobalt magnet used in the sensor of this invention has a steep magnetization characteristic and a permeability approaching unity which significantly reduces sensor coil signal due to small variations in the noted air gap. As a result, noise in the signal output of the sensor due to tolerance in the pole face spacing is substantially reduced and the risk of erroneous signal output due to even extreme vibration of the exciter wheel is effectively eliminated. Further, although increasing speed of rotation of the exciter wheel tends to result in sharply increasing amplitude in the sensing coil signal due to the increased rate of change of flux density in the magnetic circuit of the mechanism, the use of the small rare earth-cobalt magnet permits an additional coil with shorted turns to be accommodated in the mechanism without excessively increasing the bulk of the mechanism, such a shorted coil tending to provide a small reduction in signal output of the sensor at lower vehicle speeds but assuring that such signal reduction also tends to increase with increasing exciter wheel rotational speed for preventing excessive increase in output signal amplitude.

Other objects, advantages and details of the novel and improved variable reluctance magnetic speed sensing mechanism of this invention appear in the following detailed description of preferred embodiments of the invention, the detailed description referring to the drawings in which.

Figure 1:
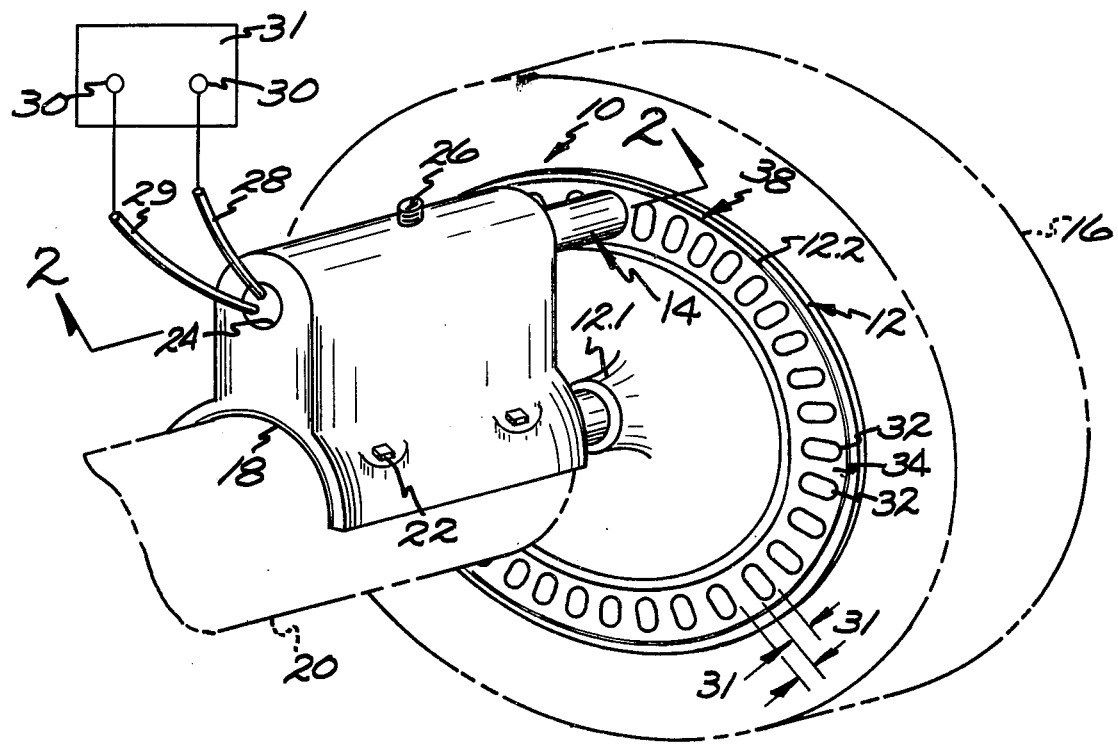
FIG. 1 is a diagrammatic perspective view of the mechanism of this invention.
Figure 2:
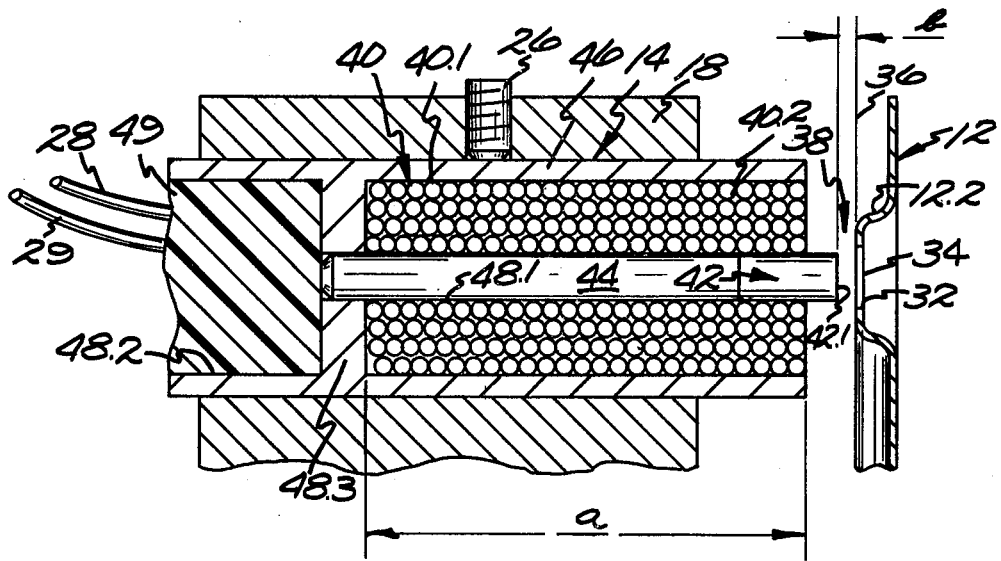
FIG. 2 is a section view to enlarged scale along line 2—2 of FIG. 1.

Referring to the drawings, 10 in FIGS. 1 and 2 indicates a preferred embodiment of the novel and improved variable reluctance magnetic speed sensing mechanism of this invention which is shown to include a movable member such as an exciter wheel 12 adapted to be mounted for movement with a device whose speed is to be monitored. The mechanism also includes a sensor 14 mounted at a sensing station in a fixed position relative to the exciter wheel. As shown in FIG. 1, the mechanism 10 of this invention is diagrammatically illustrated as being arranged for use in a motor vehicle skid control system wherein the exciter wheel 12 is mounted in any conventional way for rotation with a motor vehicle wheel diagrammatically indicated in FIG. 1 by the broken lines 16 and wherein the sensor 14 is fixedly or adjustably mounted relative to the exciter wheel by mounting an adapter 18 on a portion of the vehicle axle or frame diagrammatically indicated in FIG. 1 by the broken lines 20. Typically, for example, the sensor 14 is provided in a generally cylindrical configuration and the adapter 18, secured to the vehicle axle or frame by screws 22, has a bore 24 slidably receiving the sensor and has a set screw 26 for locking the sensor in a selected position in the adapter base relative to the exciter wheel 12. Leads 28 and 29 extending from the sensor 14 are connected to appropriate wheel speed sensor terminals 30 in a motor vehicle skid control system of conventional type diagrammatically illustrated at 31 in FIG. 1.

The movable member or exciter wheel 12 is preferably formed of a disc of low carbon sheet steel or other ferromagnetic material, typically by use of a disc hub 12.1, and is provided with a plurality of apertures 32 which are disposed in equally spaced relation to each other around the perimeter of the disc so that ferromagnetic means such as the portions 34 of the disc located between the apertures 32 are moved in sequence in a plane, indicated at 36 in FIG. 2, through a sensing station indicated at 38 in FIGS. 1 and 2 as the exciter wheel is rotated. Preferably, as shown in the drawings, the exciter wheel disc has a raised or elevated disc perimeter portion 12.2 extending out of the general plane of the disc for accommodating the disc apertures, thereby to dispose the ferromagnetic means 34 in plane 36 with clearance between this plane and the remainer of the disc. Preferably also, each of the disc apertures 32 and each of the ferromagnetic portions 34 are of equal width $w$, this width preferably being relatively small on the order of 0.100 inches for permitting a large number of ferromagnetic portions 34 to be accommodated around the exciter wheel periphery. Alternately, the disc perimeter is provided with indentations in place of the noted apertures so that the ferromagnetic means 34 are formed by the disc portions located between the disc indentations. Of course, where a device such as a spur gear or the like whose speed is to be monitored inherently provides spaced ferromagnetic portions thereon which are adapted to be moved in a plane through a sensing station at a frequency corresponding to the speed of movement of the device, the movable member or exciter wheel 12 is omitted from the speed sensing mechanism 10.

In accordance with this invention, the sensor 14 mounted at the sensing station 38 is of novel and advantageous structure. As is best shown in FIG. 2, the sensor 14 comprises a wire sensing coil 40 which is preferably wound in a generally tubular configuration of selected length $a$ to accommodate a large number of turns of insulated wire of relatively fine wire diameter. Typically, for example, the sensor coil 40 embodies a single strand, solid copper magnetic wire 40.1 having a lacquer or enamel insulation therein (not shown), the metal portion of the wire having a diameter on the order of about 0.005 inches and being wound to provide on the order of 5000 to 10,000 winding turns in the coil. With this large number of turns of fine wire, an electrical signal of suitable amplitude is readily induced in the coil in response to small variations in the strength of a magnetic field to which the coil is subjected while the dimensions of the coil is maintained within suitable limits, such a coil typically having an inner diameter of about 0.250 inches, an outer diameter of about 0.250 inches, and a length $a$ of about 1.50 inches.

In accordance with this invention, a permanent magnet 42 is disposed within the sensor coil 40, the magnet being formed of a rare earth-cobalt alloy having a very steep magnetization characteristic. The magnet 42 is of much shorter length than the coil 40 and is disposed at a first end 40.2 of the coil, preferably with at least a portion of the magnet extending from the coil, as shown, to dispose a first pole face 42.1 of the magnet in selected, closely spaced relation to the plane of movement 36 of the ferromagnetic means 34 of the exciter wheel. Typically, the magnet is provided in a short, round or square, rod configuration having a diameter of about 0.250 inches and a length of about 0.100 inches and is formed of sintered, magnetically ordered particles of a samarium-cobalt alloy having a composition SmCo$_5$, such a magnet having a residual induction (Br) of 8500 gauss, a coercive force (H$_c$) of 4,500 oersteds, and a peak or maximum available energy product (B$_d$H$_d$) max. or (BH) max. greater than about 8 megagauss-oersteds. Alternately, the permanent magnet 42 is formed of an alloy of cobalt and other rare earths such as yttrium, cerium, lanthanum, praesodymium or mischmetal or the like. As such rare earth-cobalt magnet materials are well known to have very steep magnetization characteristics and to display high energy product properties, they are not further described herein and it will be understood that the term rare earth-cobalt magnet as used herein is intended to refer to any permanent magnet material embodying rare earth and cobalt constituents and having a maximum available energy product (B$_d$H$_d$) max. greater than about 8 megagauss-oersteds.

In accordance with this invention, the permanent magnet 42 as above-described is preferably proportioned so that the width of the magnet pole face 42.1 is substantially the same as the width of the individual ferromagnetic portions 34 of the exciter wheel disposed between adjacent apertures on the exciter wheel.

In accordance with this invention, the sensor coil 40 having a permanent magnet 42 therein at one coil end, is preferably provided with a core member 44 of a soft iron alloy or other ferromagnetic material disposed within the remainder of the length of the coil and is also provided with a ferromagnetic shell 46 which is disposed around the periphery of the coil and which is magnetically connected to the core at the opposite coil end. Typically for example, a cylinder 48 of a soft iron alloy is provided with two chambers 48.1 and 48.2, with a flange or wall 48.3 separating the chambers, and with an aperture 48.4 extending between the chambers, as shown in FIG. 2. The permanent magnet 42 is then abutted, or cemented or otherwise secured, to a soft iron core member rod 44 and the coil 40 is wound on the magnet and on a portion of the core. The resulting structure is then secured within the shell chamber 48.1 by press-fitting a portion of the core member into the aperture 48.4. The ends of the sensor coil 40 are then extended through additional apertures (not shown) to serve as sensor leads 28 and 29 which are potted in the chamber 48.2 in any conventional manner as indicated at 49 and which are electrically connected to apropriate terminals 30 of a motor vehicle skid control. In this arrangement, the core member 44 is magnetically connected to the ferromagnetic shell 46 by the flange 48.3 at the end of the coil opposite from the first coil end 40.2. Preferably the shell 46 is proportioned so that the end face 46.1 of the shell has a surface area substantially greater than the area of the magnet pole face 42.1.

The motor vehicle skid control 31 or the like to which the speed sensing mechanism of this invention is electrically connected is of any conventional type. Typically, for example, the sensing mechanism is connected to the speed sensor terminals of a skid control system such as that shown in the copending, commonly assigned application for patent Ser. No. 266,798 filed June 27, 1972, now U.S. Pat. No. 3,982,793, wherein, as will be understood, the sensing mechanism cooperates with that skid control system in regulating braking of the vehicle wheel 16 in accordance with speed determinations made by the mechanism with respect to the wheel.

In accordance with this invention, the sensor 14 is mounted at the sensing station 38 by the adapter 18 with the magnet pole face 42.1 spaced closely adjacent to the plane of movement 36 of the ferromagnetic means 34 on the exciter wheel so that, while allowing reasonable tolerances in manufacture and mounting of the sensor and exciter wheel, the spacing b between the magnet pole face and the plane 36 is as small as possible while still permitting free rotation of the exciter wheel free of interference with the magnet pole face.

In operation of the sensing mechanism 10, the permanent magnet cooperates with the exciter wheel 12 and with the shell 46, the flange 48.3 and the core 44 to form a magnetic circuit for the magnet flux provided by the permanent magnet, the spacing of the magnet pole face 42.1 from the exciter wheel 12 constituting an air gap in that magnetic circuit. Accordingly, with the magnet pole face spaced closely adjacent to the plane of movement 36 of the ferromagnetic means 34 on the exciter wheel, the air gap, and therefore the reluctance of the magnetic circuit, is varied significantly as each of the individual ferromagnetic means 34 is moved through the sensing station past the pole face during exciter wheel rotation. Accordingly, an electrical signal is induced in the sensor coil 40 during each such variation in reluctance so that the frequency of the output signal provided by the sensor coil corresponds to the speed of rotation of the exciter wheel, thereby to provide an electrical indication of the speed of rotation of the vehicle wheel 16.

As the permanent magnet 42 is formed of a rare earth-cobalt material having an inherently high available energy product, the magnet is adapted to be very small while still providing high flux density in the noted magnetic circuit to assure provision of an output signal of adequate amplitude by the sensor coil without requiring an excessive number of turns in the sensor coil. The use of the small magnet permits the pole face 42.1 of the magnet to have a small width to assure that, although a large number of small, closely spaced ferromagnetic means 34 are provided on the exciter wheel to increase information output from the exciter wheel, no more than one of such ferromagnetic means is moving past the pole face at any given time. In this way, certain noise increments in the signal provided by the sensor coil are avoided. Further, use of the small magnet permits the ferromagnetic core 44, flange 48.3 and shell 46 to be incorporated in the sensor to serve as flux return path means while still retaining the desired small and compact size of the sensor 14. Further, the use of the small rare earth-cobalt magnet with its inherent steep magnetization characteristic and the disposition of the small magnet at one end of the sensor coil assure that leakage flux from the magnet itself does not tend to pass through the sensor coil so that the signal output by the sensor coil does not include any significant noise increment due to such leakage flux. Most important, the steep magnetization characteristic and the high permeability of the rare earth-cobalt material and the disposition of the small magnet at a location immediately adjacent to the air gap b assures that there is minimum flux fringing in the air gap and that there is minimal variation in the reluctance of the noted magnetic circuit due to tolerance-related variations in the air gap or due to air gap variations caused by rapid vibration of the exciter wheel 12. Accordingly, the sensing mechanism 10 of this invention is adapted to be economically manufactured and mounted with reasonable tolerances for use in the skid control system without risk that the electrical output produced by the sensor coil will have an excessively low signal to noise ratio and without risk that vibrations of the exciter wheel such as might occur while a heavy vehicle is braking on a steep hill could result in an erroneous signal output by the sensing mechanism.

Figure 3:
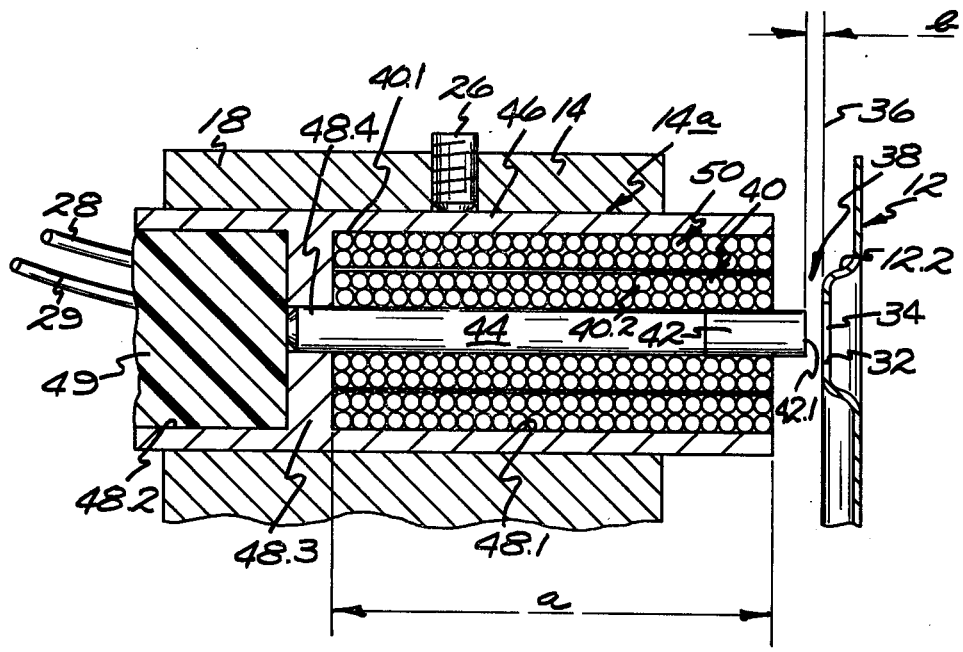
FIG. 3 is a section view similar to FIG. 2 illustrating an alternate embodiment of this invention.
Figure 4:
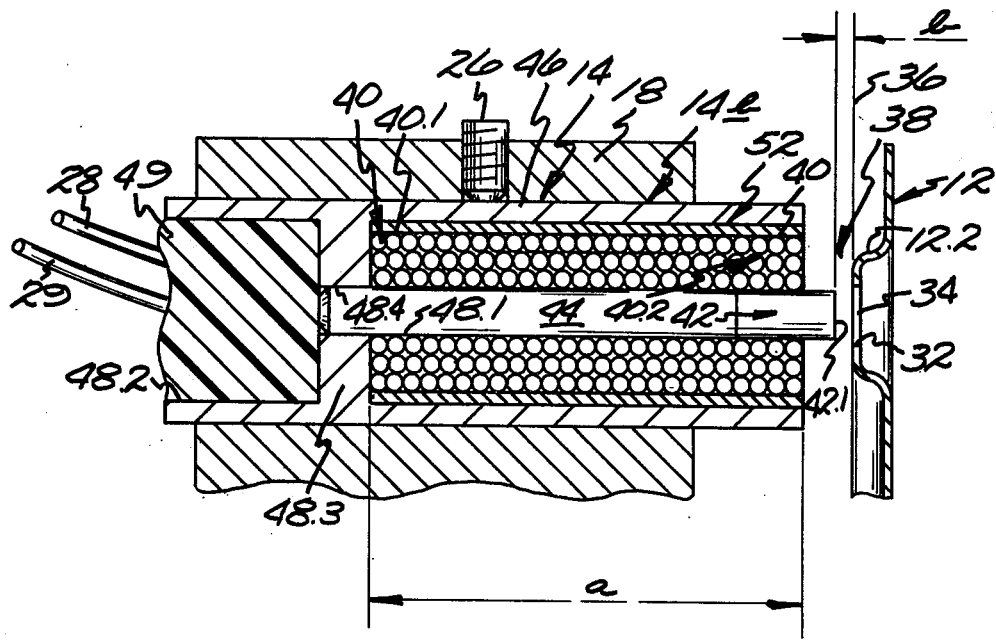
FIG. 4 is a section view similar to FIG. 2 illustrating another alternate embodiment of this invention.

In alternate preferred embodiments of the sensing mechanism as shown in FIGS. 3 and 4, an additional shorted coil is incorporated in the mechanism to facilitate use of the mechanism in determining widely varying device speeds. In this regard, the voltage of electrical signal provided by the sensor coil 14, being a function of the rate of change of flux density in the noted magnetic circuit, will tend to increase as the speed of rotation of the exciter wheel increases and as the individual ferromagnetic elements 34 are moved more rapidly through the sensing station 38. Typically for example, the output signal voltage can vary from 0.5 to 5.0 volts as motor vehicle speed varies over the customary vehicle speed range, thereby causing some difficulty in utilizing the signal output in the skid control system 31. However, in the alternate mechanism shown in FIGS. 3 and 4, wherein mechanism components corresponding to those illustrated in FIGS. 1 and 2 are identified by corresponding reference numerals, the use of the small rare earth-cobalt magnet permits an additional shorted coil to be accommodated in the sensor 14 without excessively increasing the sensor size. Thus, the sensor 14a as shown in FIG. 3 is provided with a continuous winding 50 of a single strand of copper wire corresponding to the wire used in sensor coil 40. Alternately, a copper tube 52 is provided in the sensor 14b shown in FIG. 4 to serve as a single turn shorted coil. In each of these arrangements, an electrical current is induced in the additional shorted coil as the ferromagnetic means 34 of the exciter wheel are moved through the sensing station 38, the magnetic field which is established by this current in the shorted coil opposing the magnetic field established by the permanent magnet 42, thereby to effectively reduce the amplitude of signal output of the sensing coil 40 to a selected limited extent. When the speed of rotation of the exciter wheel 12 is relatively low so that the voltage of the sensing coil output signal is relatively low, the reduction in amplitude of the output signal effected by the shorted coil is very small. However, as the exciter wheel rotational speed increases and provides a sensing coil signal of increasing amplitude, the reduction in amplitude of the output signal effected by the shorted coil means also increases, thereby tending to restrict variation of the sensing coil output voltage within relatively narrow limits. By proper proportioning of the shorted coils 50 or 52 relative to the sensing coils in the speed sensing mechanisms, the amplitude of the output signal voltage of the sensing mechanism is retained within very narrow limits for considerably facilitating utilization of the signal in a skid control system or the like.

It will be understood that the speed sensor of this invention can be modified by various conventional means to provide differential or multipole magnetic sensing mechanisms and the like. It should also be understood that although particular embodiments of the sensing mechanism of this invention have been described by way of illustrating this invention, the invention includes all modifications and equivalents of the disclosed embodiments falling within the scope of the appended claims.

I claim:
1. A variable reluctance speed sensing mechanism for use in a skid control system comprising an exciter wheel having a plurality of ferromagnetic portions of selected width disposed in equally spaced relation to each other around the periphery of said exciter wheel, said exciter wheel being adapted to be mounted for rotation with a motor vehicle wheel whose speed is to be monitored for moving said ferromagnetic portions in a plane through a station at a rate corresponding to the speed of rotation of the vehicle wheel, and a magnetic sensor adapted to be mounted at said station, said sensor comprising a wire sensing coil having a selected number of coil turns and having a tubular configuration of a selected length, and a permanent magnet of a rare earth-cobalt material, said magnet having a rod configuration of a relatively much shorter length than said coil disposed within the coil at a first end thereof and having one magnet pole face disposed in selected closely spaced relation to the plane of movement of said ferromagnetic portions of said exciter wheel, whereby the reluctance of a magnetic circuit established by said permanent magnet is varied by movement of said ferromagnetic portions through said station to induce an electrical signal in said coil having a frequency corresponding to the speed of movement of said motor vehicle wheel.

2. A mechanism as set forth in claim 1 wherein said sensor further comprises a core of ferromagnetic material disposed within the remainder of the length of said coil, a shell of ferromagnetic material disposed around said coil, and ferromagnetic means magnetically connecting said core and said shell at the opposite end of said coil for forming flux return path means for the magnetic circuit established by said permanent magnet.

3. A mechanism as set forth in claim 1 having additional shorted turn coil means disposed around a portion of the magnetic circuit established by said permanent magnet for limiting the voltage of the electrical signal produced by said wire sensing coil during relatively high speed of movement of said vehicle wheel.

4. A mechanism as set forth in claim 2 having additional shorted turn coil means disposed around at least one of said core and said permanent magnet for limiting the voltage of the electrical signal produced by said wire sensing coil during relatively high speed of movement of said vehicle wheel.

5. A mechanism as set forth in claim 4 wherein said additional coil means comprises a continuous coil of electrically conductive wire disposed around said permanent magnet and said core.

6. A mechanism as set forth in claim 4 wherein said additional coil means comprises a tube of electrically conductive metal disposed around said permanent magnet and said core.

7. A variable reluctance speed sensing mechanism for use in a skid control system comprising an exciter wheel of a ferromagnetic material having a plurality of apertures of selected width disposed in equally spaced relation to each other around the periphery of said exciter wheel to form a plurality of ferromagnetic wheel portions of said selected width around the periphery of said wheel at locations between said apertures, said exciter wheel being adapted to be mounted for rotation with a motor vehicle wheel whose speed is to be monitored for moving said ferromagnetic exciter wheel portions in a plane through a station at a rate corresponding to the speed of rotation of the vehicle wheel, and a magnetic sensor adapted to be mounted at said station, said sensor comprising a wire sensing coil having a selected number of turns of electrically conductive wire and having a tubular configuration of a selected length, a permanent magnet of a rare earth-cobalt material, said magnet having a rod configuration of a relatively much shorter length than said coil and having at least a first pole face of said selected width, said magnet being disposed within said coil at a first end thereof with said first pole face is selected, closely spaced relation to the plane of movement of said plurality of ferromagnetic exciter wheel portions, a ferromagnetic core disposed within the remainder of the length of said coil, a ferromagnetic shell disposed around said coil, and a ferromagnetic flange magnetically connecting said core and shell at the opposite end of said coil to form flux return path means for a magnetic circuit established by said permanent magnet, whereby the reluctance of said magnetic circuit is varied by movement of said ferromagnetic exciter wheel portions through said station to induce an electrical signal in said coil having a frequency corresponding to the speed of movement of said motor vehicle wheel.

8. A mechanism as set forth in claim 7 having an additional wire coil having shorted coil turns of electrically conductive wire material disposed around the periphery of said core and permanent magnet for limiting the voltage of the electrical signal produced by said wire sensing coil as the speed of movement of said vehicle wheel increases.

9. A mechanism as set forth in claim 7 having a tube of electrically conductive material disposed around the periphery of said core and permanent magnet for limiting the voltage of the electrical signal produced by said wire sensing coil as the speed of movement of said motor vehicle wheel increases.

10. A variable reluctance speed sensor for use with a movable member having ferromagnetic means spaced thereon to be moved in a plane through a station at a rate corresponding to the speed of movement of said member, said sensor comprising means for mounting said sensor at said station, a wire sensing coil having a selected number of coil turns and having a tubular configuration of selected length, and a permanent magnet of a rare earth-cobalt material having a rod configuration of a relatively much shorter length than said coil, said magnet being disposed within said coil at a first end thereof and having one magnet pole face disposed in selected closely spaced relation to said plane of movement of said ferromagnetic means on said movable member, whereby the reluctance of a magnetic circuit established by said permanent magnet is varied by movement of said ferromagnetic means of said movable member through said station to induce an electrical signal in said coil having a frequency corresponding to the speed of movement of said movable member.

11. A mechanism as set forth in claim 10 wherein said sensor further comprises a core of ferromagnetic material disposed within the remainder of the length of said coil, a shell of ferromagnetic material disposed around said coil, and ferromagnetic means magnetically connecting said core and said shell at the opposite end of said coil for forming flux return path means for the magnetic circuit established by said permanent magnet.

12. A mechanism as set forth in claim 10 having additional shorted turn coil means disposed around a portion of the magnetic circuit established by said permanent magnet for limiting the voltage of the electrical signal produced by said wire sensing coil during relatively high speed of movement of said movable member.

13. A mechanism as set forth in claim 11 having additional shorted turn coil means disposed around at least one of said core and said permanent magnet for limiting the voltage of the electrical signal produced by said wire sensing coil during relatively high speed of movement of said movable member.

14. A mechanism as set forth in claim 13 wherein said additional coil means comprises a continuous coil of electrically conductive wire disposed around said permanent magnet and said core.

15. A mechanism as set forth in claim 13 wherein said additional coil means comprises a tube of electrically conductive metal disposed around said permanent magnet and said core.

* * * * *